United States Patent
Hayes et al.

(10) Patent No.: US 11,861,953 B1
(45) Date of Patent: Jan. 2, 2024

(54) SYSTEMS AND METHODS FOR USING SENSORS TO DETERMINE A HOLISTIC VEHICLE CHARACTERISTIC AND/OR TO GENERATE PARAMETERS FOR A VEHICLE SERVICE

(71) Applicant: Allstate Insurance Company, Northbrook, IL (US)

(72) Inventors: Howard Hayes, Glencoe, IL (US); Jorge Caraballo Falcon, Chicago, IL (US); John Bradley Moats, Gurnee, IL (US); Surender Kumar, Palatine, IL (US); David Border, Palatine, IL (US); Ashley Greenwell, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 205 days.

(21) Appl. No.: 16/142,506

(22) Filed: Sep. 26, 2018

(51) Int. Cl.
  *G07C 5/00* (2006.01)
  *G07C 5/08* (2006.01)
  *G06Q 40/08* (2012.01)

(52) U.S. Cl.
  CPC .......... *G07C 5/0808* (2013.01); *G06Q 40/08* (2013.01); *G07C 5/008* (2013.01)

(58) Field of Classification Search
  CPC ....... G07C 5/0808; G07C 5/008; G06Q 40/08
  USPC ...................................................... 701/32.5
  See application file for complete search history.

(56) References Cited

U.S. PATENT DOCUMENTS

| 6,003,808 | A  | 12/1999 | Nguyen et al. |
| 6,609,050 | B2 | 8/2003  | Li |
| 8,155,817 | B2 | 4/2012  | Desterling |
| 8,176,145 | B1 | 5/2012  | Stender et al. |
| 9,536,254 | B1 | 1/2017  | David |

(Continued)

FOREIGN PATENT DOCUMENTS

| EP | 3107068 A1 | 12/2016 |
| WO | 2018029914 A1 | 2/2018 |

OTHER PUBLICATIONS

Denise Johnson "As Insurers See Value of Vehicle Telematics in Claims Handling, Access to Data Could Change" https://www.claimsjournal.com/news/national/2015/12/09/267519.htm Dec. 9, 2015, pp. 1-5.

(Continued)

*Primary Examiner* — Tyler J Lee
*Assistant Examiner* — Tiffany P Ohman
(74) *Attorney, Agent, or Firm* — Polsinelli PC

(57) ABSTRACT

Systems and methods for using a computing device with sensors to determine a holistic characteristic. The computing device is configured to receive from a user device, via a first wireless data connection, a request to generate vehicle service parameters, based on a current condition of a feature of a vehicle, receive from the user device, via the first wireless data connection, vehicle-specific identifying information, determine data for a past condition for the feature of the vehicle, using the vehicle-specific identifying information, establish a second wireless data connection with an electronic system of the vehicle, receive, from the electronic system of the vehicle, via the second wireless data connection, data of a current condition for the feature, compare the data of the past condition and the data of the current condition, and generate a vehicle service parameter based on the comparison.

19 Claims, 5 Drawing Sheets

(56) References Cited

U.S. PATENT DOCUMENTS

| 9,934,629 | B2 | 4/2018 | Wittliff |
| 2008/0255887 | A1 | 10/2008 | Gruter |
| 2009/0138290 | A1 | 5/2009 | Holder |
| 2012/0246036 | A1 | 9/2012 | Marr et al. |
| 2014/0201022 | A1 | 7/2014 | Balzer |
| 2015/0100506 | A1 | 4/2015 | Binion et al. |
| 2017/0147990 | A1 | 5/2017 | Franke et al. |
| 2017/0337573 | A1* | 11/2017 | Toprak ................ G07C 5/006 |

OTHER PUBLICATIONS

S. Kevin Andrews et al., "Designing an IoT Enabled Vehicular Diagnostics System using Automotive Sensors and Actuators Integrated with Onboard Video Camera" https://www.ripublication.com/ijaer17/ijaerv12n19_39.pdf International Journal of Applied Engineering Research ISSN 0973-4562 vol. 12, No. 19, 2017, pp. 1-5.
Tim Miller "10 Best Professional Automotive Diagnostic Scanners Review 2018" https://www.obdadvisor.com/professional-automotive-scanners/ May 11, 2018, pp. 1-44.

\* cited by examiner

SYSTEMS AND METHODS FOR USING SENSORS TO DETERMINE A HOLISTIC VEHICLE CHARACTERISTIC AND/OR TO GENERATE PARAMETERS FOR A VEHICLE SERVICE

TECHNICAL FIELD

Aspects of the disclosure generally relate to sensors and the analysis of vehicular conditions obtained from sensors. In particular, various aspects of the disclosure include a framework for determining a holistic vehicle characteristic and/or to generate parameters for a vehicle service.

BACKGROUND

Car sellers and car buyers may often appraise a vehicle or aspect of a vehicle, for example, to determine a holistic vehicle characteristic, e.g., for a vehicle sale, or to determine parameters that may be used in a vehicle service contract. Current methods of appraisal may factor publicly available information, including dealer transactions, depreciation costs for unique automobiles and market financial data. An appraisal value may also be based on readily available factors pertaining to the type of vehicle, including, the year, make, model, trim, and mileage. Likewise a consumer may desire to confirm the validity of the price of a used vehicle. The consumer may look up publicly available information to determine a valid price for the vehicle, for example, using available sources like Kelly Blue Book or Edmunds. However, current methods may not be objectively specific. At best, current methods for appraising a vehicle may be based on subjective human observations of the condition of the vehicle, e.g., "very good", "fair", "rough", "damaged", etc. or may be based on a subjective manipulation of tools for gathering data, e.g., misreading an odometer, rounding values, using expired data, etc.

There is a desire for a framework for assessing a vehicle or aspect of a vehicle objectively, for example, from data collected from electronic sensors found in mobile devices and/or incorporated into automobiles and other types of vehicles. For example, telematics systems, such as on-board diagnostics (OBD) systems may provide information from the vehicle's on-board computers and sensors, allowing users to monitor a wide variety of information relating to the vehicle systems. Likewise, mobile devices may be equipped with various forms of sensors to obtain data related to automobiles and other vehicles.

Furthermore, there is a desire for systems and methods for automatically analyzing the data obtained from these sensors to not only appraise various aspects of a vehicle but generate or determine vehicle-specific parameters that may be used in a sale of or service of the vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for using sensors to determine a holistic characteristic of a vehicle (e.g., a fair market value, a suggested sale price, a rating, etc.) parameter(s) for a vehicle and/or to generate parameters for a vehicle service. These parameters may be used, for example, to generate an agreement for a vehicle service (e.g., vehicle service contract (VSC)), and/or determine the likelihood that a particular vehicle may require service in the future. Thus, one or more computing devices, systems, or servers (e.g., "management system") may receive a request from a user to determine a characteristic of a vehicle (e.g., a price of a used car that the user is interested in buying or selling) or to generate or determine parameters that may be used, e.g., in a vehicle service contract. It is contemplated that the characteristic of the vehicle or the generation of parameters may depend on an objective assessment of the vehicle, e.g., based on data collected from sensors. In order to process the request, the management system may establish a connection with computing devices or systems operating the sensors, to drive the sensors toward gathering the appropriate data. For example, a telematics device, may be configured to collect vehicle operational data and transmit the data to a vehicle conditions computer system or server. Vehicle operational data may include various data collected by the vehicle's internal sensors, computers, and cameras, such as the vehicle's speed, rates of acceleration, braking, or steering, impacts to the vehicle, usage of vehicle controls, and other vehicle operational data. Additional image data, video data, vehicular sound data, and/or vehicular performance data, acceleration or rotational data, may be received from one or more mobile devices in order to analyze the potentially high-risk or unsafe driving event. The present condition of the vehicle for one or more vehicle features may be calculated or adjusted based on the gathering of the data from their appropriate sensors (vehicle telematics systems, mobile devices, third parties, etc.) and the analysis of the this data. The present condition may be quantified based on the various data metrics obtained from sensors found in the vehicle (on board diagnostics systems, global positioning systems, etc.), mobile devices, or external sources.

Systems and methods are disclosure for using sensors to determine a holistic characteristic for a vehicle and/or to generate parameter(s) for a vehicle service. One method comprises: receiving, by a computing device having at least one processor and from a user device of a user via a first wireless data connection, a request to generate one or more vehicle service parameters, based on a current condition of at least one of a plurality of features of a vehicle; receiving, by the computing device and from the user device via the first wireless data connection, vehicle-specific identifying information; determining, by the computing device, data for a past condition for each of the plurality of features of the vehicle, using the vehicle-specific identifying information; establishing, by the computing device, a second wireless data connection with electronic system(s) of the vehicle; receiving, by the computing device and from electronic system(s) of the vehicle via the second wireless data connection, data of a current condition for at least one of the plurality of features of the vehicle; comparing, by the computing device, the data of the past condition and the data of the current condition for the at least one of the plurality of features of the vehicle; and generating, by the computing device one or more vehicle service parameters based on the comparison and based on the vehicle-specific identifying information.

Another method comprises: receiving, by a computing device having at least one processor and from a user device of a user via a first wireless data connection, a request to estimate a current holistic characteristic of a vehicle, wherein the current holistic characteristic is based at least on a current condition of at least one of a plurality of features of the vehicle; receiving, by the computing device and from the user device via the first wireless data connection, vehicle-specific identifying data of the vehicle, and a current condition for at least one of the plurality of features of the vehicle; receiving and storing, by the computing device, an original holistic characteristic value of the vehicle as a hypothesized holistic characteristics value of the vehicle; determining, by the computing device, an original condition for at least one of the plurality of features of the vehicle, using the vehicle-specific identifying data; comparing, by the computing device, the original condition and the current condition, for the at least one of the plurality of features of the vehicle; and updating the hypothesized characteristic value of the vehicle based on the comparison and the vehicle-specific identifying data to determine a value for the current holistic characteristic of the vehicle.

In accordance with other embodiments of the present disclosure, a system comprises: one or more processors; and memory storing computer-executable instructions that, when executed by the one or more processors, cause the system to: receive, from a user device via a first wireless data connection, vehicle-specific identifying information of a vehicle; identify the vehicle as a known vehicle from a database of known vehicles in the memory, using the vehicle-specific identifying information; receive data for a past condition for at least one of a plurality of features of the vehicle; establish a second wireless data connection with electronic system(s) of the vehicle; receive, from electronic system(s) of the vehicle via the second wireless data connection, data of a current condition for at least one of the plurality of features of the vehicle; compare the data of the past condition and the data of the current condition for the at least one of the plurality of features of the vehicle; and store results of the comparison to the memory.

In accordance with further aspects of the present disclosure, the present vehicle conditions for specific aspects or features of the vehicle may be compared to reference vehicle conditions for the specific aspects or features of the vehicle to determine any depreciation or appreciation of the aspect or feature of a vehicle. The reference vehicle condition may include a known condition of an aspect or feature of a vehicle when it was manufactured or sold as a new car (e.g., "original vehicle condition", "original condition", etc.), a known condition of an aspect or feature of a vehicle in the past (e.g., "past vehicle condition", "past condition," etc.) For example, the original condition of a vehicle's front right tire (e.g., a vehicle aspect or feature) may have been excellent, while the present condition of the vehicle's front tire may be poor. Reference vehicle conditions may be received externally (e.g., from third party sources), and/or may be retrieved from one or more databases.

In accordance with further aspects of the present disclosure, after determining the state (e.g., appreciation, depreciation, no change, etc.) of various pertinent features or aspects of the vehicle, based on the comparisons of present conditions to reference conditions, the management server may generate or update an entry for a data structure that lists a holistic characteristic for the vehicle. The holistic characteristic may be a numerical value representing, for example, a suggested price or fair market value for the vehicle. Alternatively or additionally, the management server may use the determined states for the pertinent vehicle features or aspects to generate parameters for a vehicle service or vehicle service agreement, e.g., a vehicle service contract. For example, a vehicle service contract may be customized to have data fields whose entries would correspond with the parameters based on the assessed states of the various vehicle features.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
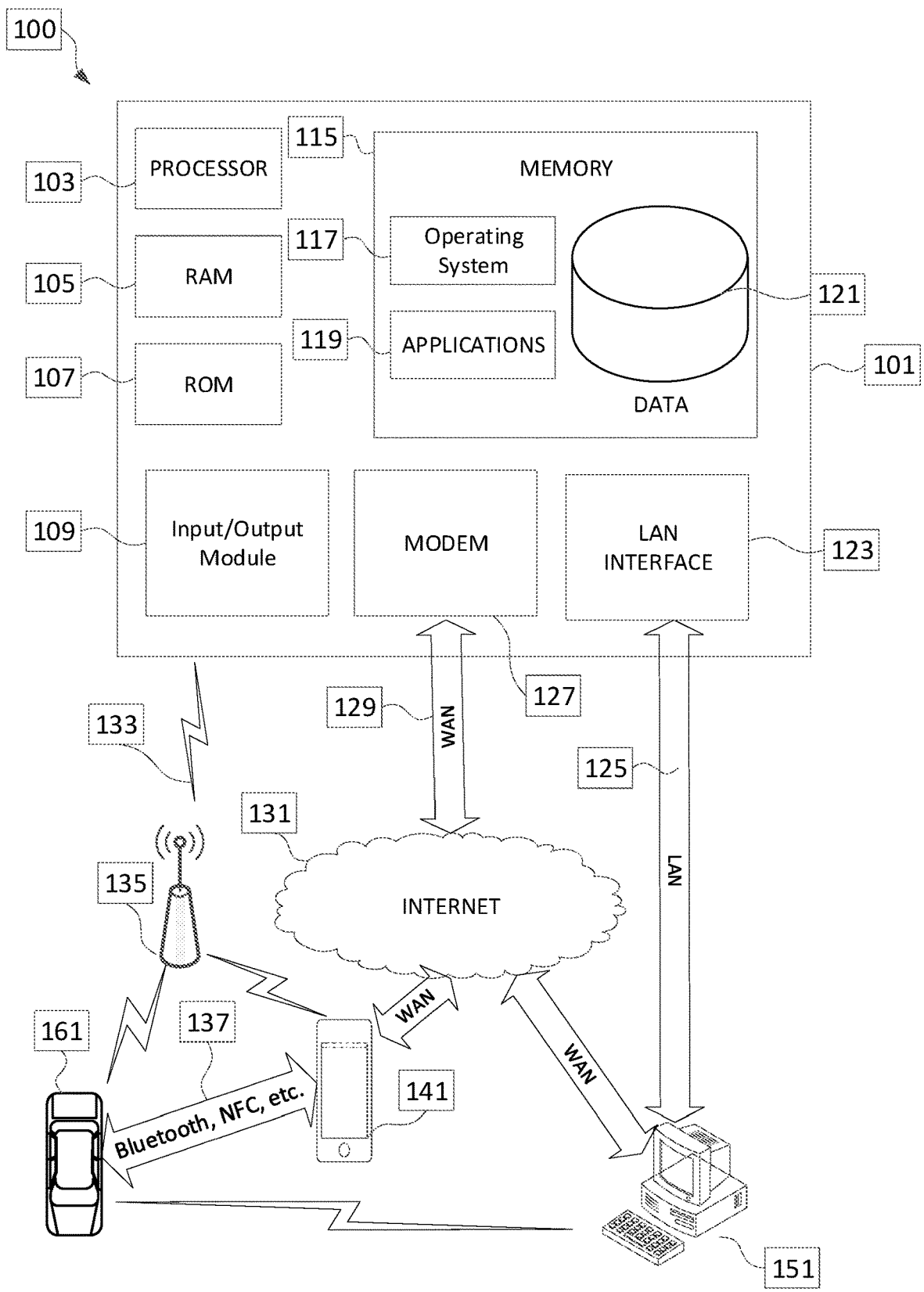
FIG. 1 illustrates a network environment and computing systems that may be used to implement aspects of the disclosure.

FIG. 1 illustrates a block diagram of a computing device, server, or system 101 in communication system 100 that may be used according to one or more illustrative embodiments of the disclosure. For example, a computing device, server, or system (e.g., "management system") may manage requests to determine a holistic characteristic of a vehicle or generate or determine parameters for use in a vehicle service contract for the vehicle, and coordinate usage of various sensors to obtain data metrics, and make assessments. The device 101 may have a processor 103 for controlling overall operation of the device 101 and its associated components, including RAM 105, ROM 107, input/output module 109, and memory 115. The computing device 101, along with one or more additional devices (e.g., terminals 141, 151, 161) may correspond to any of multiple systems or devices, such as wireless computing devices 141, configured as described herein for receiving data obtained from sensors within, and third party computing systems 161 (e.g., telematics servers, vehicle on board diagnostics (OBD) servers, etc.), configured as described herein for receiving vehicle data gathered from sensors in vehicles 161 and presenting the data to relevant parties, including management system 101.

Input/Output (I/O) 109 may include, for example, a microphone, keypad, touch screen, and/or stylus through which a user of the computing device 101 may provide input, and may also include one or more of a speaker for providing audio output and a video display device for providing textual, audiovisual and/or graphical output. In some embodiments, computing device 101 may itself be a user device used by a user to initiate a request for a vehicle service contract or vehicle pricing, whereby input/output (I/O) 109 may be used to enter relevant information or send relevant multimedia content. In such embodiments, the user device may be equipped with various sensors described herein (e.g., camera, infrared sensor, gyroscope, etc.) to determine a holistic vehicle characteristic and/or to generate parameters for a vehicle service. Alternatively or additionally, this user device 101 may have in-built hardware designed to perform various methods described in the present disclosure, and may be carried by the user to vehicle which the user desire's to seek an assessment of.

Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the management system 101 to execute a series of computer-readable instructions to receive a request from a wireless computing device 141 of a user (e.g., to price a vehicle or generate a VSC), establish connections with sensors found in terminals 141, 151, 161, obtain current data (including but not limited to, quantifiable data, image data, video data, sound data, and/or movement data) from sensors that can determine present conditions of one or more vehicle features, receive reference data from terminals 141, 151, 161, perform an analysis based on a comparison of current data to reference data, and execute the request.

The management system 101 may operate in a networked environment 100 supporting connections to one or more remote computers, such as terminals 141 151, and 161. The terminals 141, 151, and 161 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the management system 101. The network connections depicted in FIG. 1 include a local area network (LAN) 125 and a wide area network (WAN) 129, and a wireless telecommunications network 133, but may also include other networks. When used in a LAN networking environment, the management system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, LTE, is presumed, and the various computing devices, vehicle service contract generating components, and vehicle pricing components described herein may be configured to communicate using any of these network protocols or technologies. In some embodiments, for example, where the computing device 101 is of a user device 141, 151, the network connections may facilitate a connection and communication with a vehicle 161 using short range communication technologies 137 (e.g., Bluetooth, NFC, etc. 137)

Additionally, one or more application programs 119 used by the management server/system 101 may include computer executable instructions (e.g., vehicle assessment programs and/or algorithms, vehicle service contract programs and/or algorithms, vehicle pricing programs and/or algorithms) for receiving a request from a wireless computing device 141 of a user (e.g., to determine a holistic characteristic of a vehicle or generate parameters for use in a vehicle service contract (VSC)), establishing connections with sensors found in terminals 141, 151, 161, receiving current data (including but not limited to, quantifiable data, image data, video data, sound data, and/or movement data) from sensors that can determine present conditions of one or more vehicle features, receiving reference data from terminals 141, 151, 161, comparing the received current data to the received reference data, executing the original request, and performing other related functions as described herein.

As used herein, a condition (or vehicle condition) may refer to a measurement of functional performance, health, durability, aging, structural condition, aesthetic appeal, or wear for a specific vehicle feature or aspect. It is contemplated that various methods presented herein overcome subjective human assessment of a condition by relying directly on sensors to measure conditions. In various embodiments, a vehicle feature or vehicle aspect pertains to tangible or intangible assets of a vehicle that affect the value of the vehicle. Some vehicle features (e.g., "conditional features," "condition-based vehicle features," "conditional vehicle features," etc.), may be characterized as having a condition, performance quality, and/or health that is susceptible to changes. Broadly, conditional vehicle features may include a vehicle's exterior, interior, mechanical, software, or hardware, which may be prone to aging, rust, damages, errors, etc. For example, conditional features may include, e.g., tires, mileage, any part of the vehicle's body (exterior and interior), engine performance, oil filter, any machinery of the vehicle, safety features, car seats, vehicle entertainment system, lighting, autopilot performance, etc. There may also be some vehicle features ("non-conditional vehicle features") that do not necessarily have a measurable condition, performance, and/or health, but may nevertheless affect the value of the vehicle. Non-conditional vehicle features may include, for example, the type of transmission (e.g., automatic versus manual), category of vehicle (e.g., minivan, sedan, convertible, etc.), vehicle maintenance history, vehicle accident history, safety/feature malfunction related vehicle recalls announced by the manufacturer, ownership and type of use history (e.g., in a ridesharing system), structural fixtures, etc. Furthermore, non-conditional vehicle features may also include identifying information of the vehicle (e.g., make, model, color, year of manufacture or sale, etc.).

In some arrangements, factors that are not vehicle-specific may also be considered in the generation of parameters for use in a vehicle service contract, determining a holistic characteristic of a vehicle, or general assessment of a vehicle. For example, a driver score of the driver of the vehicle may be calculated based on various driver-specific information (e.g., driving records, accident reports, driver's credit history, driver's license history, etc.). In some embodiments, a driver score may be a rating generated by an insurance company, financial instruction, or other organization, based on the driver's age, vision, medical history, driving record, and/or other account data relating to the driver.

As discussed below, the condition of a vehicle feature or aspect may appreciate, depreciate, or stay the same based on the real-time data collected by vehicle sensors, mobile device sensors, telematics devices, third party sources, and other systems for measuring the condition of the vehicle.

Figure 2A:
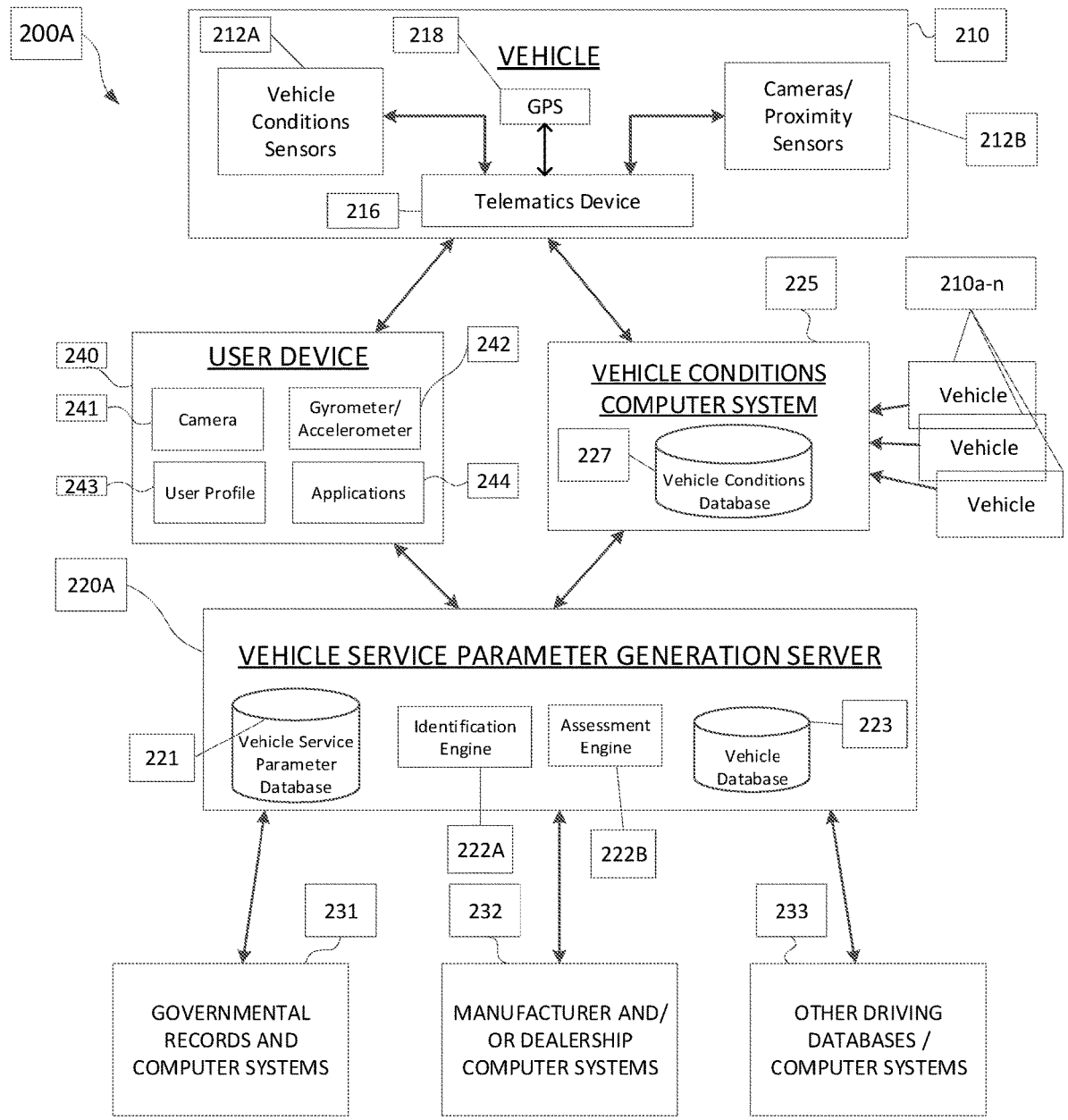
FIG. 2A is a diagram of a vehicle service parameter generation system, according to one or more aspects of the disclosure.
Figure 2B:
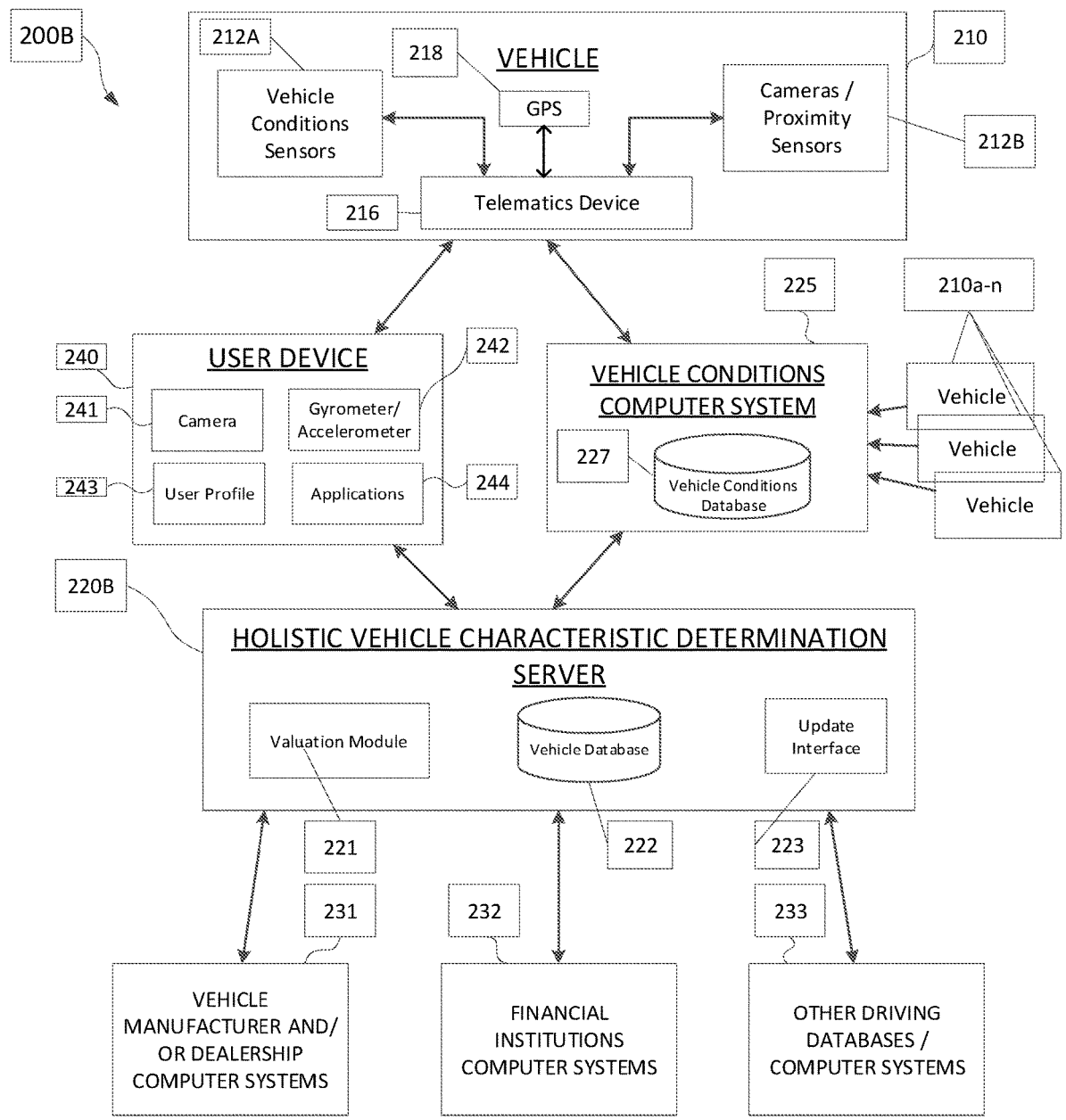
FIG. 2B is a diagram of a holistic vehicle characteristic determination system, according to one or more aspects of the disclosure.

FIGS. 2A-2B are diagrams of systems for performing various methods described in the present disclosure. For example, various combinations of steps described in FIGS. 2A-2B may be used to perform an assessment of a vehicle. The assessment may be based on establishing wireless connections with sensors, and receiving data pertaining to vehicle conditions obtained from sensors. Each component shown in FIGS. 2A-2B may be implemented in hardware, software, or a combination of the two. Additionally, each component of the vehicle service parameter generation system 200A, as depicted in FIG. 2A, or a holistic vehicle vehicle characteristic system 200B, as depicted in FIG. 2B, may include a computing device (or system) having some or all of the structural components described above for computing device 101.

For example, FIG. 2A is a diagram of a vehicle service parameter generation system 200A, according to one or more aspects of the disclosure. The vehicle service parameter generation system 200A shown in FIG. 2A includes a vehicle 210, such as an automobile, motorcycle, recreational vehicle, boat, or other vehicle for which a vehicle service contract is desired and for which parameters may be generated. The conditions of various features of the vehicle may be measured via sensors on user device 240 and/or vehicle 210. The vehicle 210 may include vehicle operation sensors 212A capable of detecting and recording various conditions at the vehicle and operational parameters of the vehicle. For example, sensors 212A and 212B may detect and store data corresponding to the vehicle's speed, distances driven, rates of acceleration or braking, and specific instances of sudden acceleration, braking, and swerving. Sensors 212A and 212B may also detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 212A and 212B may detect and store the vehicle's external features and driving conditions, for example, the vehicle's front, side, and rear body exterior, the vehicle's windshield conditions, the vehicle's wiper conditions, external temperature, rain, snow, light levels, and sun position for driver visibility. Sensors 212A may also detect and store data relating to moving violations and the observance of traffic signals and signs by the vehicle 210. Additional sensors 212A may detect and store data relating to the vehicle's mechanical features and that provide further indications of maintenance of the vehicle 210. The data gathered from these sensors may include, for example, the engine status, oil level, engine coolant temperature, odometer reading, the level of fuel in the fuel tank, engine revolutions per minute (RPMs), and/or tire pressure.

The vehicle 210 also may include one or more cameras and proximity sensors 212B capable of recording additional conditions inside or outside of the vehicle 210. Internal cameras 212B may detect conditions such as the number of the passengers that typically ride the vehicle 210, and conditions of the interior features of the vehicle (e.g., habitability, dashboard wear, seat wear). External cameras and proximity sensors 212B may detect other nearby vehicles, traffic levels, road conditions, traffic obstructions, animals, cyclists, pedestrians, and other conditions that may factor into a user's driving history and other user-specific information relevant for the generation of vehicle service contracts.

The operational sensors 212A and the cameras and proximity sensors 212B may store data within the vehicle 210, and/or may transmit the data to one or more external computer systems (e.g., a vehicle conditions computer system 225 and/or a vehicle service contract server 220). As shown in FIG. 2A, the operation sensors 212A, and the cameras and proximity sensors 212B, may be configured to transmit data to a vehicle conditions computer system 225 via a telematics device 216. In other examples, one or more of the operation sensors 212A and/or the cameras and proximity sensors 212B may be configured to transmit data directly without using a telematics device 216. For example, telematics device 216 may be configured to receive and transmit data from operational sensors 212A, while one or more cameras and proximity sensors 212B may be configured to directly transmit data to a vehicle conditions computer system 225 or the vehicle service contract (VSC) server 220 without using the telematics device 216. Thus, telematics device 216 may be optional in certain embodiments where one or more sensors or cameras 212A and 212B within the vehicle 210 may be configured to independently capture, store, and transmit vehicle conditions and driving data.

Telematics device 216 may be a computing device containing many or all of the hardware/software components as the computing device 101 depicted in FIG. 1. As discussed above, the telematics device 216 may receive data pertaining to a vehicle's conditions from vehicle operation sensors 212A, and cameras 212B, and may transmit the data to one or more external computer systems (e.g., a vehicle conditions computer system 225 and/or a vehicle service contract server 220) over a wireless transmission network. Telematics device 216 also may be configured to detect or determine additional types of data relating to real-time driving and the condition of the vehicle 210. In certain embodiments, the telematics device 216 may contain or may be integral with one or more of the vehicle sensors 212A and proximity sensors and cameras 212B discussed above, and/or with one or more additional sensors discussed below.

The telematics device 216 also may collect information regarding the vehicle's location, driver's route choice, whether the driver follows a given route, percentage of miles vehicle is driven in autonomous mode verses manual mode if applicable, and a classification or type of trip (e.g. commute, errand, new route, etc.) via a global positioning system (GPS) 218. Information regarding routes traversed by the vehicle (e.g., gained from sensors in GPS 218) may provide information on why the conditions for one or more vehicle features are the way they are. Thus, information supplied by GPS 218 may be useful to the generation of parameters for use in, for example, a vehicle service contract (VSC).

The telematics device 216 also may store vehicle-specific information, for example, the make, model, trim (or sub-model), year, and/or engine specifications. The vehicle type may be programmed into the telematics device 216 by a user or customer, determined by accessing a remote computer system, such as manufacturer and/or dealership computer systems 232, or may be determined from the vehicle itself (e.g., by accessing the vehicle's 210 computer systems).

Vehicle conditions computer system 225 may be a computing device separate from the vehicle 210, containing some or all of the hardware/software components as the computing device 101 depicted in FIG. 1. The vehicle conditions computer system 225 may be configured to receive and store the vehicle conditions data discussed above from vehicle 210, and similar vehicle conditions data from one or more other vehicles 210a-n. In one embodiment, the vehicle conditions computer system 225 may be a vehicle operations computer system or server that act as a management system for vehicles having telematics devices. In the example shown in FIG. 2A, the vehicle conditions computer system 225 includes a vehicle conditions database 227 that may be configured to store the vehicle operation data collected from the vehicle sensors 212A, proximity sensors and cameras 212B, and telematics devices 216 of a plurality of vehicles. The vehicle conditions database 227 may store data pertaining to the conditions of various vehicle features measured by sensors 212A-B, including camera generated data (e.g., image, audio, and/or video). The vehicle conditions database may also include location data and/or time data (e.g., generated from GPS 218) for multiple vehicles 210.

Data stored in the vehicle conditions database 227 may be organized in any of several different manners. For example, a table in the vehicle conditions database 227 may contain data pertaining to the vehicle's current conditions for a specific vehicle 210. The table may list the current conditions for each of a plurality of vehicle features. Vehicle conditions data may also be organized by time, so that a recorded condition of a specific vehicle feature may be timestamped. Thus, the gradual progression or deterioration of vehicle conditions of multiples vehicles 210 may be tracked more effectively.

User device 240 may be a computing device separate from the vehicle 210 and the vehicle conditions computer system 225. User device 240 (alternatively referred to as "mobile device") may include a mobile phone (e.g., smartphone), personal computer, tablet computer, laptop, or the like, which may include at least some of the features described herein. The user device 240 may be configured to receive and store the vehicle conditions data discussed above from vehicle 210, and similar vehicle conditions data from one or more other vehicles 210a-n. Furthermore, the user device may be able to form wired and/or wireless data connections with other computing systems and devices, such as the vehicle service contract server 225, described further below, via the internet 131 or telecommunications network 135. The user device may include various sensors configured to collect and transmit data related to conditions of various vehicle features. For example, the user device may include an in-built or accessible camera 241 that may generate image, sound, and/or video data. These data may evidence, for example, the current condition of an engine (e.g., by its sound), or the wearing down of a car seat, or collision induced damage to a car's exterior. In methods described further below, this data pertaining to the vehicle's condition may be compared with reference data of the vehicle's original conditions. Other sensors within the user device may include a gyrometer or accelerometer 242 to measure acceleration and/or rotation of the vehicle. Other types of sensors may also be downloaded as applications 244. The user device may also store user-specific identifying information, e.g., as part of user profile 243, which can be accessed by the vehicle service parameter generation server 220. The user profile 243 may be used by the vehicle service parameter generation server 220 to gain further user-specific information from other external sources (e.g., online profiles, governmental records and computer systems 231, etc.). The user device may also run programs or applications 244 on a user interface. One application or program may enable a user to use the systems and methods described herein to generate parameters for use in, for example, a vehicle service contract and/or assess the value of a vehicle (e.g., as depicted in FIG. 2B). The application or program may be provided to the user device or hosted by management system 101 (e.g., via applications interface 119). In one embodiment, the user device may include one or more subcomponents of management system 101.

The system 200 also may include a remote, local, or connected server or computing system for generating parameters for a vehicle service ("vehicle service parameter generation server") 220, containing some or all of the hardware/software components as the computing device 101 depicted in FIG. 1. The vehicle service parameter generation server 220A may include hardware, software, and network components to receive vehicle conditions data and vehicle-specific or user-specific identification information from the vehicle conditions computer system 225, user device(s) 240, and/or directly from a plurality of vehicles 210. The vehicle service parameter generation server 220, the vehicle conditions computer system 225, and the user device 240 may be implemented as a single server/system, or may be separate servers/systems. In some examples, the vehicle service parameter generation server 220A may be a central server configured to receive vehicle conditions data from a plurality of remotely located vehicle conditions computer systems 225.

As shown in FIG. 2A, vehicle service parameter generation server 220A may include a vehicle service contracts (VSC) database 221 ("VSC database" 221), an identification engine 222A, an assessment engine 222B, and a vehicle profiles and maintenance database 223 ("vehicle database" 223). Engines 222A and 222B may be implemented in hardware and/or software configured to perform a set of specific functions within the vehicle service parameter generation server 220. For example, the identification engine 222A and the assessment engine 222B may facilitate the entry and modification of information in the identification-based and assessment based data fields stored within the VSC database, respectively. The assessment engine 222B may include one or more marks or score calculation algorithms through which assessment-based data structures within VSC database can be populated. Calculations may be executed by one or more software applications running on generic or specialized hardware within the vehicle service parameter generation server 220. The engines 222A-222B may use the vehicle conditions data received from the vehicle conditions computer system 225 and/or user device 240 and compare to original vehicle conditions stored in vehicle database 223.

In some embodiments, vehicle database 223 may regularly synchronize and/or update the latest vehicle-specific information on known vehicles by communicating with manufacturer and/or dealership computer systems 232, and other driving databases and computer/systems 233. In at least some embodiments, vehicle database 223 may store maintenance specific information about a vehicle of a plurality of vehicles. The maintenance specific information may include, for example, a maintenance history of services performed on a vehicle, a time a vehicle part is repaired or replaced since manufacture, information pertaining to whether any safety issues related to a vehicle recall has been taken care of in a timely manner, and the location of where a service was performed. The maintenance specific information may be obtained and/or updated from dealership systems, e.g., periodically. In some embodiments vehicle database 223 may include a plurality of separate databases. For example, a vehicle profile database storing vehicle-specific information retrieved from manufacturer and/or dealership computer systems may be distinct from a vehicle maintenance database storing maintenance specific information retrieved from dealership systems.

Further descriptions and examples of the algorithms, functions, and analyses that may be executed by the VSC database 221, engines 222A-222B, and the vehicle database 223 are described below in reference to FIGS. 3-4.

To generate one or more parameters for use in, for example, a vehicle service contract using an objective assessment of conditions directly from sensors, the vehicle service parameter generation server 220A may initiate communication with and/or retrieve data from one or more vehicles 210, vehicle conditions computer systems 225, user device(s) 240, and additional computer systems 231-233 storing data that may be relevant to the generation of the vehicle service contract ("VSC"). For example, one or more manufacturer and/or dealership computer systems 232 may store information about the original condition of a vehicle. Governmental databases and computer systems 231 may store image and video data recorded by traffic cameras various specific locations and times, or provide user-specific driving history, collision history, criminal records, etc., which may be relevant for generating an appropriate VSC. One or more additional driving databases/systems 233 may store information relevant towards obtaining more information about the user, e.g., the user's online profile and spending behavior, which could reveal whether there were vehicle maintenance related transactions. As discussed below in reference to FIGS. 3-4, the vehicle service parameter generation server 220A may retrieve and use data from databases/systems 231-233 to analyze vehicle-specific and user-specific information to generate a VSC.

FIG. 2B is a diagram of a holistic vehicle characteristic determination system, according to one or more aspects of the disclosure. The holistic vehicle characteristic determination system 200B shown in FIG. 2B includes a vehicle 210, such as an automobile, motorcycle, or other vehicle for which a user seeks to know the value or price of. In various arrangements described herein, unless indicated otherwise, the holistic characteristic of the vehicle may include, for example, a price of the vehicle, which may refer to the value of the vehicle, excluding any markup due to a seller's desire to reap profit. The conditions of various features of the vehicle may be measured via sensors on user device 240 or vehicle 210. The vehicle 210 may include vehicle operation sensors 212A and camera and proximity sensors 212B, telematics device 216, and GPS 218, as described in FIG. 2A.

The holistic vehicle characteristic determination system 200B shown in FIG. 2B also includes the vehicle conditions computer system 225, as described in FIG. 2A. For example, the vehicle conditions computer system 225 may include a vehicle conditions database 227 to store vehicle conditions data obtained from vehicles 210 and user devices 240, as well as locational information from GPS 218.

The holistic vehicle characteristic determination system 200B shown in FIG. 2B also includes the user device 240, as described in FIG. 2A. For example, the user device 240 may be configured to receive and store the vehicle conditions data discussed above from vehicle 210, via various sensors (e.g., camera 241, accelerometer/gyroscope 242). Furthermore, the user device may also run programs or applications 244 on a user interface. One application or program may enable a user to use the systems and methods described herein to assess or determine the value of a vehicle. The application or program may be provided to the user device or hosted by management system 101 (e.g., via applications interface 119), such as the holistic vehicle characteristic determination server 220, as described below.

The system 200 also may include a holistic vehicle characteristic determination server 220, containing some or all of the hardware/software components as the computing device 101 depicted in FIG. 1. The holistic vehicle characteristic determination server 220B may include hardware, software, and network components to receive vehicle conditions data and vehicle-specific or user-specific identification information from the vehicle conditions computer system 225, user device(s) 240, and/or directly from a plurality of vehicles 210. The holistic vehicle characteristic determination server 220B, the vehicle conditions computer system 225, and the user device 240 may be implemented as a single server/system, or may be separate servers/systems. In some examples, the holistic vehicle characteristic determination server 220B may be a central server configured to receive vehicle conditions data from a plurality of remotely located vehicle conditions computer systems 225.

As shown in FIG. 2B, holistic vehicle characteristic determination server 220B may include a valuation module 221, a vehicle database 222, and an update interface 223. These components, among others, may be implemented in hardware and/or software configured to perform a set of specific functions within the holistic vehicle characteristic determination server 220B. For example, vehicle database 222 may regularly synchronize and/or update the latest vehicle-specific information on known vehicles by communicating with manufacturer and/or dealership computer systems 232, and other driving databases and computer/systems 233. An update interface 223 may be involved in the periodic updating and synchronization of the vehicle database 222. Vehicle-specific information stored in vehicle database 222 may include identifying information of the vehicle as well as data describing the original conditions of the various features of the vehicle. It is contemplated that data describing the original conditions may include image data. Thus, information stored in the vehicle database 222 may be used to identify a vehicle, e.g., from image data obtained by the user device camera 241.

The vehicle database 222 may also store an original value of the vehicle or vehicle feature. The original value may be obtained externally, e.g., from vehicle manufacturer and/or dealership computer systems 231, or other driving databases and computer systems 233 (e.g., Kelly Blue Book). In one embodiment, the original value may be calculated using valuation module 221 and information already available regarding the vehicle.

Along with the original conditions of known and identified vehicles, vehicle database may also store data pertaining to current conditions of the known and identified vehicles. This data may be obtained from sensors in the user device 240, vehicle 210, and vehicle operating system 225.

In at least some embodiments, vehicle database 222 may store maintenance specific information about the vehicle. The maintenance specific information may include, for example, a maintenance history of services performed on a vehicle, a time a vehicle part is repaired or replaced since manufacture, information pertaining to whether any safety issues related to a vehicle recall has been taken care of in a timely manner, and the location of where a service was performed. The maintenance specific information may be obtained and/or updated from dealership systems, e.g., periodically. In some embodiments vehicle database 222 may include a plurality of separate databases. For example, a database storing identifying information and conditions of a vehicle may be distinct from a database storing maintenance specific information retrieved from dealership systems.

Furthermore, the holistic vehicle characteristic determination server 220B may include a valuation module 221, which may be involved in the valuation of various features of a vehicle based on their condition, or in the calculation of a depreciation or appreciation in value, based on changing conditions of vehicle features. Thus, the valuation module 221 may include one or more calculation algorithms pertaining to a monetary value of a vehicle feature or change in monetary value due to a delta in the condition of the vehicle feature. Calculations may be executed by one or more software applications running on generic or specialized hardware within the holistic vehicle characteristic determination server 220B. In some embodiments, different variables in the calculation algorithms may be based on financial market data and trends information, which can be obtained by communicating with manufacturer and/or dealership computer systems 232, financial institutions computer systems 232, and other driving databases and computer/systems 233. In performing its calculations, valuation module may also take into consideration, maintenance specific information of a vehicle from the vehicle database 222. The maintenance specific information may include, for example, safety issues of the vehicle, information pertaining to parts malfunction or vehicle recalls announced by the manufacturer, and the maintenance history of the vehicle. It is contemplated that features of the vehicle that have gone through regular maintenance as prescribed by the vehicle's manufacturer may likely be in a better condition than another vehicle that has not followed a prescribed maintenance schedule, and may therefore be closer to its original value.

Further descriptions and examples of the algorithms, functions, and analyses that may be executed by the holistic vehicle characteristic determination server 220B are described below in reference to FIGS. 3-4.

Figure 3:
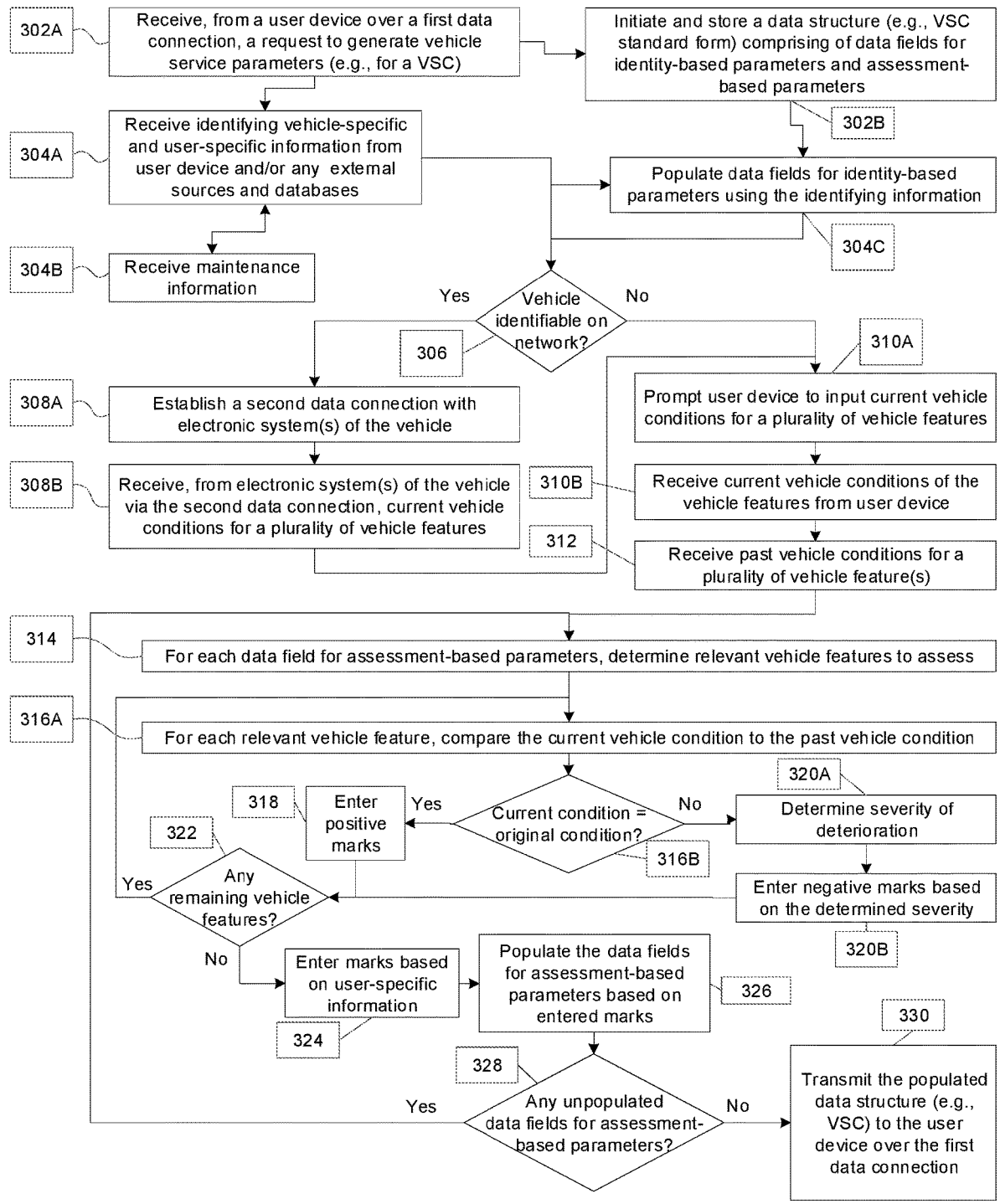
FIG. 3 illustrates a flow diagram of an example method of generating or determining parameters for use in a vehicle service contract based on data collected by and received from sensors, according to one or more aspects of the disclosure.

FIG. 3 illustrates a flow diagram of an example method of generating parameters for use in, for example, a vehicle service contract, using sensors and sensor data, according to one or more aspects of the disclosure. While the steps presented may refer to "vehicle service contracts," it is contemplated that one or more steps presented herein may also be used for the generation of parameters for other contracts or vehicle assessments. For example, the process of directly obtaining data pertaining to current conditions of a vehicle by establishing data connections with sensors on a vehicle and user device, and then comparing the data to past or original conditions of a vehicle, may be used to determine a holistic vehicle characteristic (e.g., the current value of a vehicle), e.g., as presented in FIG. 4).

Referring to FIG. 3, step 302A may include receiving a request to generate data for one or more vehicle parameters. In one embodiment, these parameters may be used in a vehicle service contract (VSC). The request may be received from a user device 240. Upon receiving the request, vehicle service parameter generation server 220A may initiate and store a data structure representing a standard form and having data fields or other data structures (e.g., sub data structures) for various parameters (e.g., as in step 302B). In one embodiment, the data structures, with its multiple data fields may comprise a standard form for a vehicle service contract. The empty data fields or data structures may be filled in with parameters generated in steps described herein. The data structures, sub-data structures, and/or data fields may be locations within memory 115 with an engine to generate or update entries into the data fields or data structures. The data structures and their corresponding data that are to be stored may be categorized based on the type of data and stored in designated data fields of the standard form or data structure. In various embodiments, unless indicated otherwise, a parameter may refer to a type of data, or a descriptor for the data. It is contemplated that data for at least some parameters are merely for identification (e.g., of the vehicle, user, driver, etc.), and their corresponding data fields may be stored in "identity based data structures". Identity-based parameters may include, for example, purchaser or seller information (e.g., name, address, contact information, driver license number, FICO score etc.), vehicle identification information (e.g., vehicle identification number (VIN), a vehicle manufacturer or make, year of manufacture, a vehicle model, current odometer reading, vehicle class, vehicle color, vehicle purchase price, vehicle financing company information, transmission, gasoline configuration, etc. It is also contemplated that data for at least some parameters provide an assessment or evaluation of a condition (e.g., of an aspect or feature of a vehicle), and their corresponding data fields may be stored in "assessment-based data structures". Thus, the initiated standard form or data structure, having data fields for storing the data of various parameters, may comprise of identity-based data structures for identity-based parameters and assessment-based data structures for assessment-based parameters. Example of assessment-based parameters may include, but are not limited to, types of vehicle services to be provided, a level or degree of service provided, roadside assistance, a waiting period for a vehicle service, discounts for a service, a contract term (e.g., based on a duration of time or mileage), a contract expiration (e.g., based on a duration of time or mileage), a deductible type or amount, a coverage or coverage plan, number of vehicle services to be provided, maximum allowed amount for the services to be performed, an options for replacement of a vehicle feature (e.g., tires), etc.

At step 304A, vehicle service parameter generation server 220A may receive identifying vehicle-specific and user-specific information. The user may input this information into an interface for application or program 119, provided or hosted by vehicle service parameter generation server 220A, on user device 240. The identifying vehicle-specific information may include, but is not limited to, the VIN, the vehicle license plate identifier, the vehicle manufacturer or make, year of vehicle manufacture, the vehicle model, color, etc. Identifying user-specific information may include, for example, user's name and contact information, address, driver license number, FICO score, etc. However, in some embodiments, user-specific information may also extend to more sensitive or confidential information pertaining to the user as that may be helpful in generating an appropriate VSC. In such embodiments, the user may be asked, via the user device, whether he or she agrees to a background check for vehicle service parameter generation server to access and retrieve this user-specific information. In one embodiment, information stored within the user device (e.g., user IDs, online profiles, etc.) may be used to retrieve this information, e.g., from other databases/computer systems 233. In other embodiments, the user may be asked to supply information through which other information can be retrieved. For example, a user may be asked to provide a social security number with which the Vehicle service parameter generation server 220A may obtain a soft or hard credit check by contacting an appropriate third party computing system 233. In another example, a user's driver license identification may be used to access the user's driving history from a government computer systems (e.g., department of motor vehicles) 232. It is also contemplated that user specific information regarding the user's driving ability may be gathered from sensors within the vehicle, which may detect and store data relating to moving violations and the observance of traffic signals and signs by the vehicle. Thus, user-specific information may extend to include information that demonstrates an ability to fulfill or satisfy contractual obligations (e.g., FICO score), demonstrated driving ability (e.g., driving records), or a demonstrated ability to maintain vehicles in good condition (e.g., maintenance checks and transactions).

In one embodiment, receiving the user-specific and vehicle-specific information gathered in step 304A may further include receiving maintenance specific information about the vehicle (e.g., as in step 304B). The maintenance specific information may include, for example, a maintenance history of services performed on a vehicle, a time a vehicle part is repaired or replaced since manufacture, information pertaining to whether any safety issues related to a vehicle recall has been taken care of in a timely manner, and the location of where a service was performed. The maintenance specific information may be obtained, e.g., from a dealership computer system.

In one embodiment, the vehicle service parameter generation server may receive identifying vehicle-specific information via a user-generated photo. The user may generate an image of the vehicle (e.g., using a camera of the user device) that depicts identifying details of the vehicle (e.g., license plate number, vehicle manufacturer or make, vehicle model, etc.) and upload or send the photo.

Step 304C may include populating the identity-based data fields of the standard form data structure generated in step 302 using the identifying information. Furthermore, a user may directly input identifying vehicle information into the identity-based data fields.

In some embodiments, the identifying information of the vehicle obtained in step 304A may also be used by vehicle service parameter generation server 220A to locate an identification or address (e.g., MAC address, IP address, etc.,) of electronic system(s) of the vehicle. In some embodiments, this identification or address may be retrieved from records or databases externally (e.g., department of motor vehicles computer systems 232, other driving databases/computer systems 233). At step 306, the vehicle service parameter generation server may determine whether the vehicle can be identified on a wireless network using the identification or address, e.g., in order to establish a connection with electronic system(s) of the vehicle itself. If a data connection can be formed, step 308A may include establishing a data connection (e.g., "second data connection") with the electronic system(s) of the vehicle. The electronic system(s) may include, for example, sensors within the vehicle (e.g., vehicle operation sensors 212A, cameras/proximity sensors 212B, etc.), an on board diagnostics (OBD) system for the vehicle, a telematics device 216, a global positioning system (GPS) 218, or a distant server or computing systems managing data obtained from various sensors of the vehicle and other vehicles (e.g., as in vehicle conditions computer system 225). The identification or address of the electronic system may identify the vehicle on a network using, e.g., internet 131, or wireless telecommunications network 133. As discussed above, having a direct wireless connection by the management system with a vehicle's electronic system(s) may be at least one way to overcome the subjective assessment of the current conditions of a vehicle by humans or by sensors controlled or manipulated by humans. Various embodiments of the present disclosure describe systems and methods by which a management system 101 may be able to obtain current conditions data obtained from sensors within the vehicle (e.g., as described in FIGS. 1, and 2).

Step 308B may include receiving, from the electronic system(s) of the vehicle via the second data connection, current vehicle conditions for a plurality of vehicle features. As discussed above, a vehicle feature or vehicle aspect pertains to tangible or intangible assets of a vehicle that affect the value of the vehicle. Some vehicle features ("conditional features," "condition-based vehicle features," "conditional vehicle features," etc.) may be characterized as having a condition, performance quality, and/or health that is susceptible to changes. Broadly, conditional vehicle features may include a vehicle's exterior, interior, mechanical, software, or hardware, which may be prone to aging, rust, damages, errors, etc. For example, conditional features may include, e.g., tires, mileage, any part of the vehicle's body (exterior and interior), engine performance, oil filter, any machinery of the vehicle, safety features, car seats, vehicle entertainment system, lighting, autopilot performance, etc.

Non-conditional vehicle features may be vehicle features that do not necessarily have a measurable condition, performance, and/or health, but may nevertheless affect the value of the vehicle. Non-conditional vehicle features may include, for example, the type of transmission (e.g., automatic versus manual), category of vehicle (e.g., minivan, sedan, convertible, etc.), structural fixtures, etc. Non-conditional vehicle features may be gathered, for example, at step 304A, after receiving identifying information of the vehicle (e.g., make, model, color, year of manufacture or sale, etc.)

It is contemplated that by connecting with electronic system(s) of the vehicle, the vehicle service parameter generation server may obtain current conditions for conditional vehicle features of the interior, hardware, or software of the vehicle, which a user may not necessarily be able to obtain via his or her user device. For example, the vehicle features may include aspects of a vehicle for which operational data is obtained by existing on board diagnostics (OBD) systems, including, e.g., speed and engine throttle position or other variable power controls of the vehicle power source, odometer readings, seat belt functionalities, activation and condition of brakes, degrees and durations of steering direction, etc., and conditions of accident avoidance devices such as turning signals, headlights, seatbelts, activation of automated braking systems (ABS), etc. Other information regarding the operation of the vehicle may also be collected, such as, but not limited to, interior and exterior vehicle temperature, window displacement, exterior vehicle barometric pressure, exhaust pressure, vehicle emissions, turbo blower pressure, turbo charger RPM, vehicle GPS location, etc. In some embodiments, step 308B may include receiving image data pertaining to the interior of the vehicle, e.g., via cameras proximity sensors 214.

In some embodiments, electronic system(s) of the vehicle may also provide and add to the repository of user-specific information (e.g., pertaining to the user's driving history and ability). For example, sensors within the vehicle may have detected, and vehicle conditions computer system 225 may have stored, data relating to moving violations and the observance of traffic signals and signs by the vehicle.

Vehicle service parameter generation server 220A may also, via its data connection with a user device, obtain data regarding vehicle conditions from sensors of user device 240. Step 310A may include prompting the user to input (e.g., via user device) current vehicle conditions for a plurality of vehicle features. Thereafter, step 310B may include receiving the current vehicle conditions of the vehicle features from user device 240.

While not always the case, it is contemplated that present conditions of a vehicle may show a deterioration from the original condition, for example, in the forms of dents, scratches, malfunctioning mechanical, software, or hardware systems, etc. As the parameters for a vehicle service agreement or contract may depend on these conditions, a user may be tempted to modify data pertaining to these conditions or present these vehicle conditions data in a light that is more favorable for the user. For example, a user may rely on data that is not actually of a current condition of a vehicle feature, but of a past condition. In order to make sure that the generated data is current, the user device may be prompted to deliver the data within a predetermined time frame. In some embodiments, the vehicle service parameter generation server may use methods known to those having ordinary skill in the art to check the authenticity of the data being delivered so that the data is indeed of the current condition of the vehicle.

Still referring to FIG. 3, step 312 may include receiving past or original vehicle conditions for a plurality of vehicle features. The plurality of features for which past vehicle conditions are received may correspond with the vehicle features for which the current conditions data were received in steps 308B and 310B. Thus, if sensors within the vehicle measured the current condition of the engine and brakes, and if the user device obtained images capturing the current condition of the vehicle's exterior, the vehicle service parameter generation server 220A may receive past or original vehicle conditions of the engine, brakes, and vehicle exterior. In order to receive past vehicle conditions for vehicle features, vehicle service parameter generation server 220A may look up and retrieve original vehicle-specific information of the vehicle from a repository or database 121. In some embodiments, step 312 may also involve searching external databases to retrieve information, for example, Kelly Blue Book, market data, etc., via internet 131, and storing the information in database 121. Information regarding the past vehicle conditions may be looked up by using the received identifying information of the vehicle as an index. It is contemplated that this repository and database may be periodically updated to store records of vehicles and information pertaining to that vehicle based on information received externally (e.g., via records of vehicle transactions, license plate records, etc.). Furthermore, for each stored record of a vehicle, the database may provide information that pertains to or helps determine the original conditions of various aspects or features of the vehicle. Thus, at step 312, the vehicle service parameter generation server 220A may determine the original vehicle conditions for a plurality of vehicle features. For example, the database may store images depicting the original conditions of various parts of the vehicle, sound and video files that reveal the original vehicle performance, data metrics and technical specifications of the vehicle as of its date of manufacturing or first sale, etc. The database may retrieve this information from vehicle data provided by vehicle manufacturers, vehicle dealerships, websites, consumers, etc.

As discussed above, the comparison of a vehicle's past or original conditions of various vehicle features with the current conditions of the vehicle features may assist in generating vehicle service parameters (e.g., fora vehicle service contract) that may be more objectively vehicle-specific. The vehicle service parameters may include data stored digitally in data structures) that merely identify the vehicle or user (e.g., data for "identity-based parameters," stored in "identity-based data structures" or "identity-based data fields") and data stored digitally in data structures that are based on an assessment of the vehicle or user (e.g., data for "assessment-based parameters," stored in "assessment-based data structures" or "assessment-based data fields"). The assessment may be based on a comparison of a current condition with an original or past condition of a vehicle feature.

After obtaining current and past conditions for a variety of vehicle features, the vehicle service parameter generation server may identify the various assessment-based data structures of the standard form generated from step 302A that may need to be filled out. Assessment-based data fields may correspond with or be related to the plurality of vehicle features for which past and present conditions data were collected. However, there may also be embodiments of vehicle service parameters where the data pertaining to vehicle features may be merely used to complete the assessment-based data fields. Thus, for each assessment-based data structure of the standard form (e.g., of a vehicle service contract), step 314 may include determining relevant vehicle features to assess.

Then, for each relevant vehicle feature, vehicle service parameter generation server may compare (e.g., as in step 316) the current vehicle condition to the past vehicle condition using the data obtained from preceding steps. The comparison may include determining whether the current condition is the same as (or within a desired level of similarity to) the past or original condition (e.g., as in step 318). A desired level of similarity may be based on predetermined or configured confidence values to measure how similar a present condition should be to a past or original condition. If there are no changes between the current condition and the original or past condition (alternatively, if a data metric for the current condition falls within a range of the original or past condition), the vehicle service parameter generation server may enter positive marks for the assessment based data structure (e.g., as in step 318). For example, if current image data of a vehicle's exterior is sufficiently similar to what the vehicle's exterior originally looked like (e.g., original condition), the vehicle service parameter generation server may leave, e.g., within a temporary memory, a positive mark or point, for an assessment-based data structure in the standard vehicle service form (e.g., coverage amount) for which a deterioration of the vehicle's exterior may be relevant. It is contemplated that each assessment-based data field may be based on a score or point system resulting from an accumulation of marks (e.g., points) provided to it during each cycle of steps 316A-324. More positive marks (or less negative marks) may lead to an entry of an assessment-based data field (e.g., as will be described in step 326) that may be more favorable for the user. More negative marks (or less positive marks) may lead to an entry of an assessment-based data field (e.g., as will be described in step 326) that may be less favorable for the user. In some embodiments, instead of providing a positive mark, the vehicle service parameter generation server 220A may merely maintain the record of marks given to the assessment-based data structure in preceding cycles. In such embodiments, the marks given to the assessment-based data structure in preceding cycles based on other relevant vehicle features of that assessment-based data structure.

The vehicle service parameter generation server 220A may then determine, at step 324 whether there are any other remaining vehicle features that are relevant for the assessment based data structure (e.g., as selected in step 314), for which past and present conditions need to be compared. If there are, steps 316A and one or more subsequent steps described herein may be repeated for those other relevant vehicle features.

If data pertaining to the current condition of the vehicle feature does not match or fall within a range of the original condition, step 320A may include determining the severity of deterioration. It is contemplated however, that in some situations, a condition may improve from an original condition (e.g., new hardware or gadgets installed into the vehicle). In such situations, step 320A may include determining a degree of appreciation of the condition. Step 320B may include providing a negative mark for the assessment-based data structure based on the determined severity of deterioration. Thus, a higher negative mark (e.g., points) may be given for a more severe deterioration of the condition of the relevant vehicle feature.

Subsequently, at step 322, the vehicle service parameter generation server 220A may determine whether there are any remaining vehicle features for which the past or original condition and present condition need to be compared. If so, steps 316-322 may be repeated. If not, vehicle service parameter generation server 220A may, at step 326, populate the assessment-based data structure based on the entered marks (e.g., from steps 318 and 320B of each relevant vehicle feature).

In some embodiments, e.g., as in step 324, the vehicle service parameter generation server 220A may also enter marks (e.g., positive or negative) based on user-specific information into the assessment-based data structures. The user-specific information may be received in step 304A. In some embodiments, the user-specific information may pertain to a user's demonstrated ability to fulfill or satisfy contractual obligations, demonstrated driving ability, or a demonstrated ability to maintain vehicles in good condition. Thus, user-specific information may include a FICO score, driving records, criminal history, property data, etc. In some embodiments, a user's online activity or spending behavior may also be considered in entering marks. For example, an online activity or spending behavior suggesting that the user has initiated or explored the possibility of entering a vehicle service contract with other contract providers may be considered. Thus, the marks from steps 318, 320B, and 324 may be summated in step 326 to determine an appropriate entry for the assessment-based data structure.

For example, an assessment-based data structure pertaining to deductible may be populated with a lesser amount (e.g., $50) if the assessment-based data structure received overall positive marks for various relevant vehicle features (e.g., vehicle has maintained most of its original conditions). However, the deductible may be higher if there were more negative marks.

At step 328, vehicle service parameter generation server 220A may determine whether there are any remaining and/or unpopulated assessment related data structures (e.g., at step 326). If so, steps 314-328 may be repeated. If not, vehicle service parameter generation server 220A may transmit the standard form (e.g., a vehicle service contract (VSC) or an offer for a vehicle service contract (VSC)), with its populated data fields, to the user device over the first data connection (e.g., as in step 328). The user may be prompted to approve or sign the generated form. In further embodiments, the user may also be able to update the form, or dispute the authenticity or veracity of any factors described herein that generated the form. It is contemplated that other contracts and assessments pertaining to a vehicle may also be generated using one or more of the steps described herein. The vehicle service parameter generation server 220A may be substituted for other server(s), computing system(s) or devices. Furthermore, in some embodiments, the user device and the computing system performing the steps described above may be a part of the same system or device.

Figure 4:
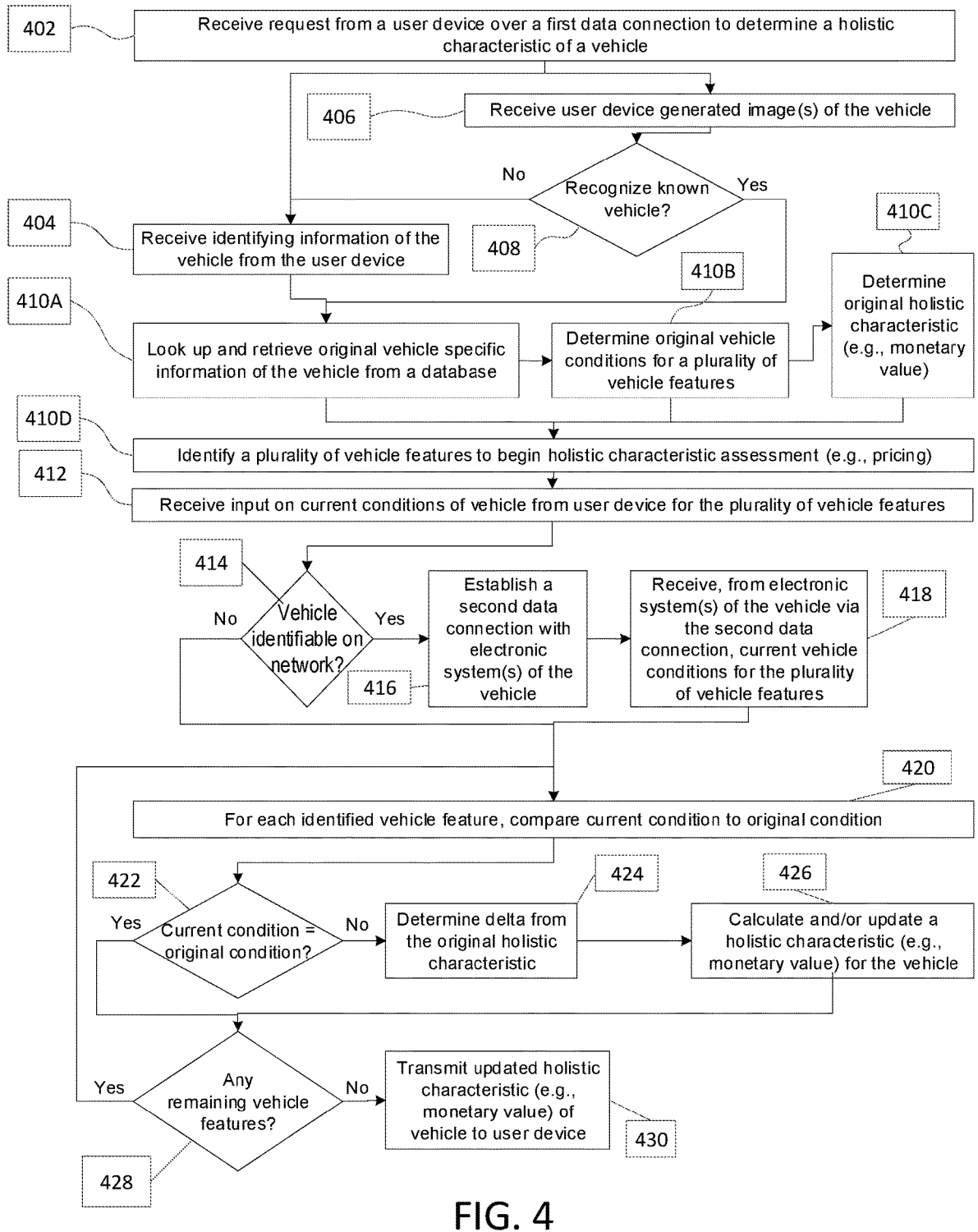
FIG. 4 illustrates a flow diagram of an example method of determining a holistic characteristic of a vehicle based on data collected by and received from sensors, according to one or more aspects of the disclosure.

FIG. 4 illustrates a flow diagram of an example method of determining a holistic characteristic of a vehicle based on data collected by and received from sensors, according to one or more aspects of the disclosure.

In some embodiments, step 402 may include receiving a request from a user device. The user device may belong to a user that seeks to determine a holistic characteristic of a vehicle (e.g., a value or price of a vehicle). The user may, for example, download an application or program that provides an interface on the user device to send the request to holistic vehicle characteristic determination server 220B. The request may be electronically sent by the user device over a first data connection (e.g., via WAN 129, Internet 131, LAN 125, or a wireless telecommunications network 133, etc.) to holistic vehicle characteristic determination server 220B. The first data connection may be established, for example, when the user downloads the application or program that facilitate communication with holistic vehicle characteristic determination server 220B.

Step 404 may include receiving identifying information of the vehicle from the user device. For example, the user seeking the price of a vehicle may enter in identifying information of the vehicle into the user device (e.g., on the application or program interface 119 of holistic vehicle characteristic determination server 220B). The identifying information may include, but is not limited to, the VIN, the vehicle license plate identifier, the vehicle manufacturer or make, the vehicle model, color, driver license number of the owner of the vehicle, etc.

Alternatively or additionally, the user may generate an image of the vehicle (e.g., using a camera of the user device) that depicts identifying details of the vehicle (e.g., license plate number, vehicle manufacturer or make, vehicle model, etc.) and upload or send the photo to holistic vehicle characteristic determination server 220B (e.g., via the application or program interface 119). At step 406, holistic vehicle characteristic determination server may receive the user device generated image(s) of the vehicle that may depict identifying details. The holistic vehicle characteristic determination server 220B may utilize image recognition techniques known to those having ordinary skill in the art to match the identifying details to a known vehicle. For example, holistic vehicle characteristic determination server 220B may detect revealing text and/or symbols from the image (e.g., the vehicle manufacturer and/or model name, a trademark or trade dress of the vehicle, license plate identifier, etc.). Thus, at step 408, the holistic vehicle characteristic determination server may determine whether it recognizes a known vehicle from the received image data. A recognition may involve holistic vehicle characteristic determination server 220B making a determination that there is sufficient identifying information (VIN, vehicle make, model, license plate number, etc.) to determine that there is a vehicle for which records may be looked up. In some embodiments, the amount of identifying information extracted from an image may be sufficient if the possibilities for identifiable vehicles are below a threshold number. For example, if holistic vehicle characteristic determination server 220B is able to detect a first manufacturer logo, a model name associated with the first manufacturer, and the year "2018" written on a license plate, the holistic vehicle characteristic determination server may be able to refine the possible results to just seven known vehicles (e.g., for various colors or editions of the 2018 model for that manufacturer). Seven results may be within a predetermined threshold of results such that the holistic vehicle characteristic determination server 220B may be deemed to have "recognized" a known vehicle from the received image data. However, if holistic vehicle characteristic determination server 220B is only able to detect the first manufacturer logo, the number of results for possible vehicles may be too large, and as such there would not be sufficient identifying information for holistic vehicle characteristic determination server to have recognized a known vehicle. Thus step 408 may involve holistic vehicle characteristic determination server 220B to search through a repository or database 121 to see any matches for the identified text or symbols that lead the pricing server to a known vehicle. In some embodiments, where there may be a plurality of known vehicles that may be detected from the received image data, or where there are more than one possible results for known vehicles that are identified from the image data, the user may be prompted to select a known vehicle from the plurality of results that matches the vehicle for which the user is requesting the price for. If there is not enough identifying information for the holistic vehicle characteristic determination server 220B to recognize a known vehicle(s), the user may be prompted to manually enter identifying details of the vehicle, which may result, e.g., in step 404.

Subsequently, at step 410A, holistic vehicle characteristic determination server 220B may look up and retrieve original vehicle-specific information of the known vehicle (e.g., as identified by the user or detected from image data) from a repository or database 121. In some embodiments, 410A may also involve searching external databases to retrieve information, for example, Kelly Blue Book, market data, etc., via internet 131, and storing the information in database 121 It is contemplated that this repository and database may be periodically updated to store records of vehicles and information pertaining to that vehicle based on information received externally (e.g., via records of vehicle transactions, license plate records, etc.) Furthermore, for each stored record of a vehicle, the database may provide information pertains to or helps determine the original conditions of various aspects or features of the vehicle. Thus, at step 410B, the holistic vehicle characteristic determination server 220B may determine the original vehicle conditions for a plurality of vehicle features. For example, the database may store images depicting the original conditions of various parts of the vehicle, sound and video files that reveal the original vehicle performance, data metrics and technical specifications of the vehicle as of its date of manufacturing or first sale, etc. The database may retrieve this information from vehicle data provided by vehicle manufacturers, vehicle dealerships, websites, consumers, etc. At step 410C, the vehicle may determine the original holistic characteristic of the vehicle. In at least one embodiment, the original holistic characteristic may refer to the original monetary value (e.g., "fair market value," "original value," etc.) of the vehicle. In some embodiments, information retrieved from database 121 including the original vehicle conditions determined in step 410B may help determine the original value of the vehicle. Alternatively or additionally, the original value may be stored as data, and/or may be looked up, e.g., from an external source.

In one embodiment, at step 410D, holistic vehicle characteristic determination server 220B may aggregate the available data regarding the past or original conditions of the vehicle (e.g., from steps 410A, 410B, and 410C), and determine the vehicle features to which the data regarding the past or original conditions pertain to. For example, a holistic vehicle characteristic determination server 220B may retrieve from a database, image data of the rear end of the vehicle, and sound files of the engine of the vehicle, both of which were generated during the manufacture or first sale of the vehicle, and are therefore data showing original or past conditions. From this, the holistic vehicle characteristic determination server 220B may identify that there are at least two vehicle features, rear exterior and engine, for which there is data pertaining to their original or past conditions. In such an example, the holistic vehicle characteristic determination server 220B may subsequently (e.g., as in step 412 described below) prompt the user device to supply data (using sensors found in the user device) of the present conditions for the identified vehicle features, e.g., rear exterior and engine. Therefore, step 410D may include identifying these plurality of vehicle features to begin a pricing assessment. Thus, in the preceding example, the identified vehicle features were the vehicle's rear exterior, and the vehicle's engine.

As discussed above, a vehicle feature or vehicle aspect pertains to tangible or intangible assets of a vehicle that affect the value of the vehicle. Some vehicle features may ("conditional features," "condition-based vehicle features," "conditional vehicle features," etc.), may be characterized as having a condition, performance quality, and/or health that is susceptible to changes. Broadly, conditional vehicle features may include a vehicle's exterior, interior, mechanical, software, or hardware, which may be prone to aging, rust, damages, errors, etc. For example, conditional features may include, e.g., tires, mileage, any part of the vehicle's body (exterior and interior), engine performance, oil filter, any machinery of the vehicle, safety features, car seats, vehicle entertainment system, lighting, autopilot performance, etc.

Thus, in step 410D, identifying conditional vehicle features may depend on what types of data regarding the vehicle is presently available and what kinds of data can be obtained. For example, if a user wishes to quickly seek the price for a used car parked (without the owner being present)

at a parking lot and has a "for sale" sign, and the user cannot unlock and enter the used car to examine its interior or test drive, the user may not necessarily be able to obtain data regarding the car's interior (e.g., car seat quality, engine performance, etc.). The user may only be able to obtain data of the vehicle's exterior using sensors within the user's mobile device (e.g., phone camera). Therefore, in such an example, the conditional vehicle features for the pricing assessment may be limited to the used car's exterior features. On the other hand, if a user wishes to sell his or her car, the user may be able to provide a lot more information for the pricing assessment, and thus a full array of conditional vehicle features (e.g., exterior, interior, mechanical, hardware, software, etc.) may be examined.

In some embodiments, step 410D may also include identifying non-conditional vehicle features that may be pertinent to pricing assessment. As discussed above, non-conditional vehicle features may be vehicle features that do not necessarily have a measurable condition, performance, and/or health, but may nevertheless affect the value of the vehicle. Non-conditional vehicle features may include, for example, the type of transmission (e.g., automatic versus manual), category of vehicle (e.g., minivan, sedan, convertible, etc.), structural fixtures, etc. Non-conditional vehicle features may be gathered, for example, at step 404, after receiving identifying information of the vehicle (e.g., make, model, color, year of manufacture or sale, etc.) In some embodiments, as will be described in step 416, vehicle features may also include aspects of a vehicle for which operational data is obtained by existing on board diagnostics (OBD) systems.

At step 412, the holistic vehicle characteristic determination server 220B may prompt the user device to obtain e.g., via its sensors, data regarding the current conditions for the plurality of vehicle features identified in step 410D. Subsequently, holistic vehicle characteristic determination server 220B may receive this data. Thus, it is contemplated that from steps 410A, 410B, 410C, 410D, and 412) the holistic vehicle characteristic determination server 220B may obtain at least the original holistic characteristic (e.g., original value) of the vehicle (e.g., from step 410C) and at least two sets of data for a plurality of features identified in step 410D, e.g., one set for the past or original conditions (e.g., from step 410B) and another set for the present conditions gathered by sensors from the user device (e.g., from step 412).

The types of data requested to be generated from the user device may depend on data received or determined in steps 410A and 410B, which involved the vehicle's original or past conditions. For example, if holistic vehicle characteristic determination server has, within its database, image data regarding the vehicle's original exterior conditions, the holistic vehicle characteristic determination server may prompt the user device to generate and deliver images of the vehicle's exterior. This data would allow the holistic vehicle characteristic determination server 220B to see the current conditions of the vehicle's exterior. In order to make sure that the generated data is indeed current, the user device may be prompted to deliver the data within a predetermined time frame. In further embodiments, the holistic vehicle characteristic determination server may use methods known to those having ordinary skill in the art to check the authenticity of the data being delivered so that the data is indeed of the current condition of the vehicle. The present conditions may show, for example, dents, scratches, etc., that may not have been present in the image data of the vehicle's original exterior conditions.

It is contemplated, however, that the user device may not be able to obtain present conditions data for all vehicle features, e.g., as identified in step 410D. For example, in the scenario where a user wishes to determine the present value of a used car that the user cannot enter into, access, or start, the user device of the use may not be able to obtain the current conditions of the vehicle's interior, mechanical, hardware, or software features. Various embodiments of the present disclosure describe systems and methods by which a management system 101 may be able to obtain current conditions data obtained from sensors within the vehicle (e.g., as described in FIGS. 1, 2, and 3.).

For example, one or both of the identifying information of the vehicle obtained in step 404, or the original vehicle specific information of the vehicle in step 410A, may include an identification or address (e.g., MAC address, IP address, etc.,) of electronic system(s) of the vehicle. The electronic system(s) may include, for example, sensors within the vehicle (e.g., vehicle operation sensors 212A, cameras/proximity sensors 212B, etc.), an on board diagnostics (OBD) system for the vehicle, a telematics device 216, a global positioning system and/or device, or a distant server or computing systems managing data obtained from various sensors of the vehicle and other vehicles (e.g., as in vehicle conditions computer system 225). The identification or address of the electronic system may identify the vehicle on a network using, e.g., internet 131, or networking device 135. Thus, step 414 may include determining whether the vehicle or an electronic system of the vehicle is identifiable on a network. If it is identifiable, step 416 may include establishing a second data connection with the electronic system(s) of the vehicle.

Step 418 may include receiving, from electronic system(s) of the vehicle via the second data connection, data regarding current vehicle conditions. In some embodiments, the data regarding current vehicle conditions may be for vehicle features identified in step 410C, e.g., vehicle features for which the holistic vehicle characteristic determination server has a corresponding original or past conditions data from step 410A and 410B. It is contemplated that by connecting with electronic system(s) of the vehicle, the holistic vehicle characteristic determination server may obtain current conditions for vehicle features of the interior, hardware, or software of the vehicle, which a user may not necessarily be able to obtain via his or her user device. For example, the vehicle features may include aspects of a vehicle for which operational data is obtained by existing on board diagnostics (OBD) systems. including, e.g., speed and engine throttle position or other variable power controls of the vehicle power source, odometer readings, seat belt functionalities, activation and condition of brakes, degrees and durations of steering direction, etc., and conditions of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. In some embodiments, step 418 may also include receiving image data pertaining to the interior of the vehicle, e.g., via cameras proximity sensors 214.

The holistic vehicle characteristic determination server may aggregate the two sets of data regarding the plurality of vehicle features identified in step 410D, e.g., one set for the past or original vehicle conditions (e.g., from step 410B) and another set for the present conditions gathered by sensors from the user device and vehicle electronic system(s) (e.g., from steps 412 and 418, respectively).

At step 420, for each identified vehicle feature, holistic vehicle characteristic determination server may compare the current vehicle condition to the original vehicle condition, e.g., using the two sets of data. For example, if an identified vehicle feature includes the interior, the present condition of the interior captured by the image data may be compared (e.g., as in steps describe further herein) with images of the interior supplied by the manufacturer to depict the original condition of the interior. From the comparison, the server may determine, at step 422, whether there was any changes, or alternatively, whether the current condition is the same as (or within a desired closeness to) the past or original condition. The comparison and determination may also involve the confidence values to measure how similar a present condition is to a past or original condition. If there are no changes between the current condition and the original or past condition, the holistic vehicle characteristic determination server may determine whether there are any other remaining vehicle features (e.g., identified in step 410D) for which the conditions need to be compared. If there are, step 420 and one or more subsequent steps described herein may be repeated.

If the current condition is not the same as (or not within a desired similarity of) the original or past condition, step 424 may include determining a delta from the original holistic characteristic (e.g., original value) of the vehicle based on the change in condition. This delta may be a degree of depreciation from the original value of the vehicle. It is contemplated that conditions of vehicle features may most likely deteriorate, given usage and time, which may lead to a depreciation of the original value of the vehicle. However, it may be possible for a condition to improve, which may potentially lead to an appreciation of value. For example an owner of new car may replace the global positioning system that came with the car, with a significantly more sophisticated global positioning system a year later, and that may, at least theoretically, contribute to an increase in value of the vehicle. Subsequently, at step 426, the server may calculate and/or update a new holistic vehicle characteristic (e.g., new value) for the vehicle based on the delta determined in step 424. The updated holistic characteristic (e.g., updated value) may be stored and the vehicle price server may determine, at step 428, whether there are any other remaining vehicle features, e.g., as identified from step 410D, for which comparisons of the condition have not already been made. If there are remaining vehicle features, steps 420 through 426 may be repeated, and the holistic characteristic (e.g., value, price, etc.) of the vehicle may continue to be updated depending on the results of the comparison of vehicle conditions. If there are no remaining vehicle features to be analyzed, holistic vehicle characteristic determination server may transmit the updated holistic characteristic (e.g., value, price, etc.) of the vehicle to the user device. It is also contemplated that non-conditional vehicle features (e.g., identifying information of the vehicle, color of the car, type of transmission, etc.) may already be factored into the determination of prices or values, e.g., at each cycle described above. For example, the original value of the vehicle may already reflect the contribution of the non-conditional vehicle features. In some embodiments, the price or value of the vehicle may also be updated to reflect situations where non-conditional features are added, removed, or altered. In further embodiments, the holistic vehicle characteristic determination server may also update the calculated holistic characteristic (e.g., current price or value of the car), to reflect geographical factors, market demands, taxes and/or subsidies, etc. Information may be obtained, for example, from other driving databases/computer systems 233 to determine the appropriate changes to a current value of the vehicle. In even further embodiments, a calculated current price or value of the vehicle may not necessarily be the fair market value of the vehicle but rather a price that the holistic vehicle characteristic determination server may determine would be most optimal for the seller, given market conditions. In such embodiments, the holistic vehicle characteristic determination server may receive market information from financial market computer systems 232.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A method comprising:
receiving, by a computing device having at least one processor and from a user, via a user device and a first wireless data connection, a request to generate one or more vehicle service parameters, based on a current condition of a first feature of a vehicle;
receiving, by the computing device and from the user device via the first wireless data connection, vehicle-specific identifying information;
determining, by the computing device, data of a past condition for the first feature, using the vehicle-specific identifying information;
establishing, by the computing device, a second wireless data connection with an electronic system of the vehicle; receiving, by the computing device and from the electronic system of the vehicle via the second wireless data connection, data of the current condition for the first feature of the vehicle;
receiving, from the user device of the user via the first wireless data connection, a user request for a vehicle service parameter associated with performing a service on the vehicle, wherein the vehicle service parameter is based on the current condition of the first feature of the vehicle;
comparing, by the computing device and responsive to receiving the user request for the vehicle service parameter, the data of the past condition and the data of the current condition for the first feature of the vehicle, wherein comparing the data of the past condition and the data of the current condition includes determining whether a difference between the data of the past condition and the data of the current condition is within a range;
entering a negative mark when the difference is not with the range;
entering a positive mark when the difference is within the range;
generating, by the computing device, based on the comparing and the vehicle-specific identifying information, the vehicle service parameter, the vehicle service parameter being generated based on at least the positive mark or the negative mark; and
prompting the user to approve an offer associated with the vehicle service parameter.

2. The method of claim 1, further comprising:
receiving, by the computing device, from the user device, and via the first wireless data connection, second data of a second current condition for a second feature of the vehicle.

3. The method of claim 2, further comprising, prior to the receiving, from the user device, the second data of the second current condition for the second feature of the vehicle:
prompting, by the computing device, the user device to activate, initiate, or enable sensors within the user device to generate the second data of the second current condition for the second feature of the vehicle.

4. The method of claim 2, further comprising:
comparing, by the computing device, the data of the past condition and the data of the second current condition for the second feature of the vehicle; and
generating, based on the comparisons and based on the vehicle-specific identifying information, the one or more vehicle service parameters.

5. The method of claim 1, further comprising:
identifying, by the computing device, the vehicle as a known vehicle from a database of known vehicles, using the vehicle-specific identifying information.

6. The method of claim 5, further comprising:
updating, by the computing device, the database of known vehicles using one or more vehicle-specific identifying information of other vehicles, received from other user devices.

7. The method of claim 1, further comprising:
receiving, by the computing device and from the user device via the first wireless data connection, a user-specific information of the user from the user device; and
generating, by the computing device, the one or more vehicle service parameters based on the comparing, the vehicle-specific identifying information, and the user-specific information.

8. The method of claim 1, further comprising:
forming, by the computing device, a plurality of data structures to store the data of the vehicle service parameter; and
entering, by the computing device, the vehicle-specific identifying information into a first data structure of the plurality of data structures, wherein the vehicle service parameter is stored in a second data structure of the plurality of data structures.

9. The method of claim 1, wherein the vehicle service parameter is associated with one of:
a service contracted to be performed on the vehicle,
a roadside assistance,
a deductible type or amount,
a coverage or coverage plan, or
an option for a replacement of a vehicle feature.

10. The method of claim 1, wherein the first feature is an interior, exterior, mechanical, or hardware asset that is a physical part of the vehicle and affects a value of the vehicle.

11. The method of claim 1, wherein the past condition is an original condition.

12. The method of claim 1, further comprising:
identifying whether there remains a second feature for which the computing device has not performed a past and current condition comparison; and
comparing, by the computing device and in response to determining that there remains the second feature for which the computing device has not performed the past and current condition comparison, data of a past condition of the second feature and data of a current condition for the second feature, wherein the vehicle service parameter is generated based on the comparison of the data of the past condition of the second feature and the data of the current condition for the second feature.

13. A system for assessing a current condition of a vehicle comprising: one or more processors; and
memory storing computer-executable instructions that, when executed by the one or more processors, cause the system to:
receive, from a user, via a user device and a first wireless data connection, vehicle-specific identifying information of a vehicle;
identify, using the vehicle-specific identifying information, the vehicle as a known vehicle from a database of known vehicles in the memory;
receive data of a past condition for a first feature of the vehicle;
establish a second wireless data connection with an electronic system of the vehicle;
receive, from the electronic system of the vehicle via the second wireless data connection, data of a current condition for the first feature of the vehicle;
receive, from the user device via the first wireless data connection, a user request for a vehicle service parameter associated with performing a service on the vehicle, wherein the vehicle service parameter is based on the current condition of the first feature of the vehicle;
compare, responsive to receiving the user request for the vehicle service parameter, the data of the past condition and the data of the current condition for the first feature of the vehicle, wherein comparing the data of the past condition and the data of the current condition includes determining whether a difference between the data of the past condition and the data of the current condition is within a range;
enter a negative mark when the difference is not with the range;
enter a positive mark when the difference is within the range;
generate, based on the comparing and the vehicle-specific identifying information, the vehicle service parameter, the vehicle service parameter being generated based at least on the positive mark or the negative mark; and
prompt the user to approve an offer associated with the vehicle service parameter.

14. The system of claim 13, the memory storing additional computer-executable instructions, which when executed by the one or more processors, cause the system to:
receive, from the user device via the first wireless data connection, a request to estimate a current holistic characteristic for the vehicle; and
determine a value of the current holistic characteristic of the vehicle based on the comparison and the vehicle-specific identifying data.

15. The system of claim 13, the memory storing additional computer-executable instructions, which when executed by the one or more processors, cause the system to:
prompt the user device to activate, initiate, or enable sensors within the user device to generate a second data of a current condition for the first feature of the vehicle; and receive, from the user device via the first wireless data connection, the second data of a current condition of the first feature.

16. The system of claim 13, the memory storing additional computer-executable instructions, which when executed by the one or more processors, cause the system to:
form a plurality of data structures to store the data of the vehicle service parameter;
enter the vehicle-specific identifying information into a first data structure of the plurality of data structures; and
enter the vehicle service parameter in a second data structure of the plurality of data structures.

17. One or more non-transitory computer readable media storing instructions that, when executed by one or more processors, cause the one or more processors to perform steps comprising:
receiving, from a user via a user device and a first wireless data connection, vehicle-specific identifying information of a vehicle;
identifying, using the vehicle-specific identifying information, the vehicle as a known vehicle from a database of known vehicles;
receiving data of a past condition for a first feature of the vehicle;
establishing a second wireless data connection with an electronic system of the vehicle;
receiving, from the electronic system of the vehicle via the second wireless data connection, data of a current condition for the first feature of the vehicle;
receiving, from the user device via the first wireless data connection, a user request for a vehicle service parameter associated with performing a service on the vehicle, wherein the vehicle service parameter is based on the current condition of the first feature of the vehicle;
comparing, responsive to receiving the user request for the vehicle service parameter, the data of the past condition and the data of the current condition for the first feature of the vehicle, wherein comparing the data of the past condition and the data of the current condition includes determining whether a difference between the data of the past condition and the data of the current condition is within a range;
entering a negative mark when the difference is not with the range;
entering a positive mark when the difference is within the range;
generating, based on the comparing and the vehicle-specific identifying information, the vehicle service parameter, the vehicle service parameter being generated based at least on the positive mark or the negative mark; and
prompting the user to approve an offer associated with the vehicle service parameter.

18. The one or more non-transitory computer readable media of claim 17, wherein the instructions, when executed by the one or more processors, cause the one or more processors to perform steps further comprising:
forming a plurality of data structures to store the data of the vehicle service parameter;
entering the vehicle-specific identifying information into a first data structure of the plurality of data structures; and
entering the vehicle service parameter in a second data structure of the plurality of data structures.

19. The one or more non-transitory computer readable media of claim 17, wherein the instructions, when executed by the one or more processors, cause the one or more processors to perform steps further comprising:
receiving, from the user device via the first wireless data connection, a request to estimate a current holistic characteristic for the vehicle; and
determining a value of the current holistic characteristic of the vehicle based on the comparison and the vehicle-specific identifying data.

* * * * *